Sept. 11, 1962  F. W. BELLER  3,053,245
OUTDOOR STOVE WITH NON-REMOVABLE ADJUSTABLE GRILL
Filed Feb. 9, 1960
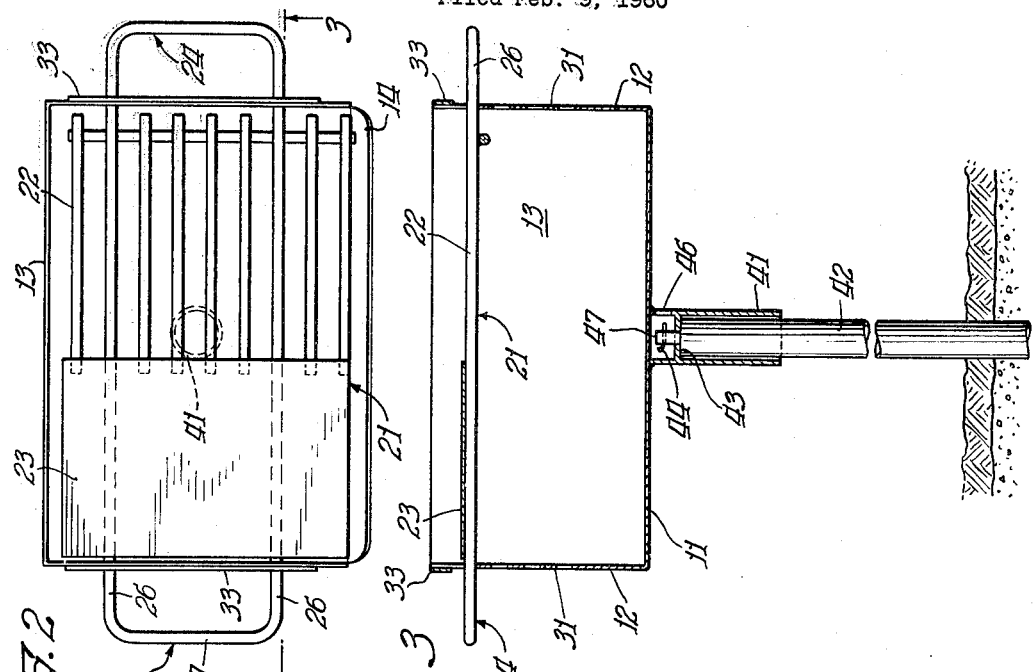
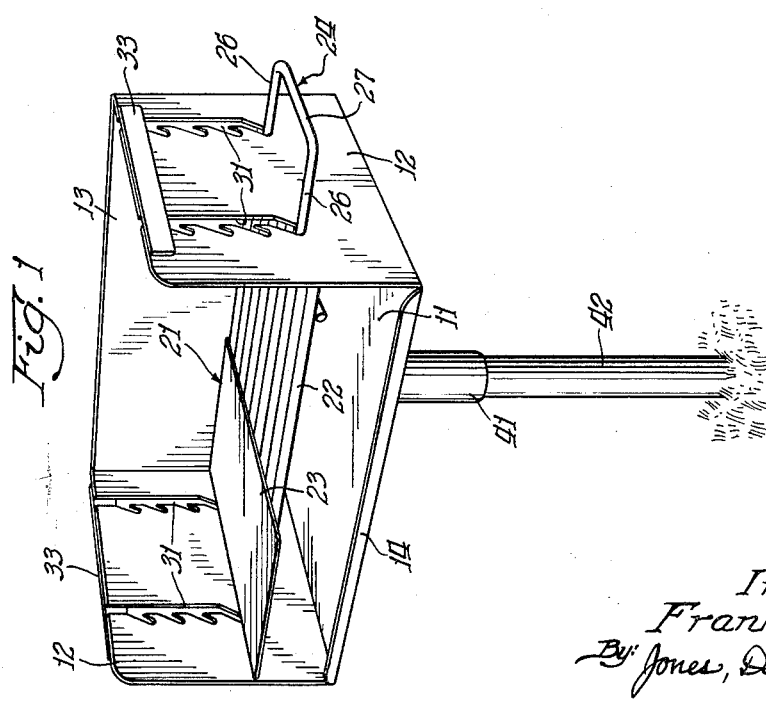
Inventor:
Frank W. Beller

United States Patent Office 3,053,245
Patented Sept. 11, 1962

3,053,245
OUTDOOR STOVE WITH NON-REMOVABLE ADJUSTABLE GRILL
Frank W. Beller, Aurora, Ill., assignor to Belson Manufacturing Company, a partnership
Filed Feb. 9, 1960, Ser. No. 7,714
2 Claims. (Cl. 126—25)

In charcoal fired grills for outdoor cooking, it is desirable to have the height of the grill above the charcoals adjustable. This adjustability has, however, presented a severe problem in charcoal grills or braziers intended to be left in public places unattended. In such places, vandalism must be expected and any movable part presents a temptation for its removal. An object of this invention was to provide a practical, attractive and economical form of outdoor stove with an adjustable but non-removable grill.

This is accomplished by providing slots extending downwardly from the top of the end walls of the camp stove, these slots being provided with notches at different levels for the different adjustments of the grill. The grill is provided with U-shaped handles at its opposite ends. During manufacture, the grill is lowered into the stove by slipping the legs of the U's down through the open upper ends of the slots. Then a bar is welded along the top edges of the end walls so as to have the effect of closing the ends of the slots. Thereafter the grill can be easily adjusted up and down, but it cannot be removed.

Additional objects and advantages will be apparent from the following description and from the drawings.

Designation of Figures

FIGURE 1 is a perspective view of a form of the invention chosen for illustration.

FIGURE 2 is a top view of the form of the invention shown in FIG. 1.

FIGURE 3 is a vertical sectional view, the portion through the stove being taken approximately along the line 3—3 of FIG. 2, and the portion through its mounting being taken diametrically of the outer tube.

Description

In its preferred form, the outdoor stove of this invention is made of generally rectangular form from heavy sheet metal or plate. It includes a bottom panel 11, end panels 12, and rear panel 13. The end and rear panels 12 and 13 are rigid with one another and with the bottom panel 11. For example, end wall 12 may be molded from the same strip as rear wall 13 and the three welded to bottom panel 11. Bottom panel 11 preferably has a forward flange 14 which holds the charcoals or other fire on the panel or fire holder 11 without making it too difficult to clean out the ashes.

A cooking rack 21 occupies substantially the entire cross section. In the illustrated form it includes a rib section 22 and a hot plate section 23.

Handles 24 extend through end wall 12. These handles are of U-shape including legs 26 and base 27. The base 27 is spaced outwardly from the end walls 12 to be easily grasped by the hand. The legs 26 may conveniently be extensions from two of the parallel grid bars of grid 22.

The handles 24 extend through slots 31 in the two end walls. As clearly seen in FIG. 1, these slots are generally vertically disposed but are notched to hold the cooking rack 21 at different levels. Preferably the notches slant as shown, to substantially eliminate the danger of accidental displacement. Nevertheless the elevation of the rack is very easily adjusted by merely grasping both of the handles 24 and raising the rack or lowering the rack to a different notch.

During manufacture, the notches 31 are simply open at their top. In other words they extend all the way to the top of the end wall 12. The various legs 26 are simply fitted into them as the rack 21 is lowered into place. Thereafter, retaining bars 33 are welded to the end walls 12 and positively prevent the removal of cooking rack 21. This welding may be spot welding, and preferably includes welding points close to each side of both of the slots 31. This sufficiently reinforces the slotted end walls 12.

Although the outdoor stove or brazier of this invention may be supported in any way, a tamper resistant swivel is preferred. For example, socket 41 may be welded to the bottom of panel 11 and may telescope over a post 42, on which disk 43 welded in socket 41 comes to rest. A cotter pin 44 is inserted through small hole 46 and finger 47 and bent open.

The resulting stove, although neat in appearance, economical to manufacture, and adequately adjustable, is virtually tamper-proof. There is no loose part readily removed. The grill or cooking rack cannot be removed without severing the metal, even though it is fully adjustable with great ease. The swivel mounting (which the uninitiated would find difficult or impossible to separate) permits turning the back toward the wind to provide best draft or in the opposite direction to let the cook escape any smoke.

I claim:

1. A vandal-resistant brazier including a fire holder positioned between opposite end walls, each end wall having therein a pair of generally vertically extending slots, a cooking rack extending over the fire holder and having at each end a sturdy U-shaped handle permanently extending therefrom with each leg of the U extending through one of the slots and with the base of the U permanently joining the legs externally of the end wall and spaced therefrom to permit grasping it by hand; the slots extending to the tops of the end walls and being open except for being in effect closed by a bar extending across the slots and welded along the tops of the end walls on both sides of all of said slots, whereby the rack, having been set in place by slipping said legs downwardly through the open slots before application of the bars is permanently retained after the bars have been applied.

2. A vandal-resistant brazier including a fire holder positioned between opposite end walls, each end wall having therein a pair of generally vertically extending notched slots, a cooking rack extending over the fire holder and having at each end a sturdy U-shaped handle permanently extending therefrom with the U formed of a single piece of material and each leg of the U extending through one of the slots and with the base of the U integrally joining the legs externally of the end wall and spaced therefrom to permit grasping it by hand; the slots extending to the tops of the end walls and being open except for being in effect closed by a bar extending across the slots and welded along the tops of the end walls on both sides of all of said slots, whereby the rack, having been set in place by slipping said legs downwardly through the open slots before application of the bars is permanently retained after the bars have been applied.

References Cited in the file of this patent

UNITED STATES PATENTS

| | | |
|---|---|---|
| 1,340,615 | Lawa | May 18, 1920 |
| 2,124,837 | Triolo | July 26, 1938 |
| 2,482,068 | Larson | Sept. 13, 1949 |
| 2,608,190 | Winning et al. | Aug. 26, 1952 |
| 2,816,538 | Miller et al. | Dec. 17, 1957 |